(12) United States Patent
Hanchett (10) Patent No.: US 9,354,026 B2
(45) Date of Patent: May 31, 2016

(54) ELECTRODE FOR ELECTRONIC WEAPONRY THAT DISSIPATES KINETIC ENERGY

(71) Applicant: TASER International, Inc., Scottsdale, AZ (US)

(72) Inventor: Mark A. Hanchett, Phoenix, AZ (US)

(73) Assignee: TASER International, Inc., Scottsdale, AZ (US)

( * ) Notice: Subject to any disclaimer, the term of this patent is extended or adjusted under 35 U.S.C. 154(b) by 0 days.

(21) Appl. No.: 14/864,237

(22) Filed: Sep. 24, 2015

(65) Prior Publication Data

US 2016/0010956 A1 Jan. 14, 2016

Related U.S. Application Data

(63) Continuation-in-part of application No. 14/301,594, filed on Jun. 11, 2014, which is a continuation of application No. 12/983,163, filed on Dec. 31, 2010, now Pat. No. 8,896,982.

(51) Int. Cl.
*F41H 13/00* (2006.01)
*A01K 15/02* (2006.01)

(52) U.S. Cl.
CPC .......... *F41H 13/0018* (2013.01); *A01K 15/029* (2013.01); *F41H 13/0012* (2013.01); *F41H 13/0025* (2013.01); *Y10T 29/49117* (2015.01)

(58) Field of Classification Search
CPC ............ F41H 13/0018; F41H 13/0025; F41H 13/0012; A01K 15/029
See application file for complete search history.

(56) References Cited

U.S. PATENT DOCUMENTS

| | | | |
|---|---|---|---|
| 3,803,463 | A | 4/1974 | Cover |
| 4,035,723 | A | 7/1977 | Kvaternik |
| 5,473,501 | A | 12/1995 | Claypool |
| 5,871,531 | A | 2/1999 | Struble |
| 5,874,691 | A | 2/1999 | Manole |
| 6,295,933 | B1 | 10/2001 | Dubocage |
| 7,065,915 | B2 | 6/2006 | Chang |
| 7,314,007 | B2 | 1/2008 | Su |
| 7,350,466 | B2 | 4/2008 | Hendrix |
| 7,743,708 | B1 | 6/2010 | Lawrence |
| 8,061,276 | B2 | 11/2011 | Danon |
| 8,342,098 | B2 * | 1/2013 | Shalev ................ F41H 13/0006 102/502 |
| 2006/0086032 | A1 | 4/2006 | Valencic |
| 2007/0101893 | A1 | 5/2007 | Shavev |
| 2012/0170167 | A1 | 7/2012 | Beechey |
| 2012/0291655 | A1 | 11/2012 | Jones |

FOREIGN PATENT DOCUMENTS

WO 2007008923 A2 1/2007

* cited by examiner

*Primary Examiner* — Zeev K Kitov
(74) *Attorney, Agent, or Firm* — Lawrence Letham (57) ABSTRACT

An electronic weapon with an installed deployment unit, from which at least one tethered electrode is launched, provides a stimulus current through a target to inhibit locomotion by the target. The wire tether, also called a filament, conducts the stimulus current. The one or more electrodes, according to various aspects of the present invention, perform one or more of the following functions in any combination: binding the filament to the electrode, deploying the filament from the deployment unit, coupling the electrode to the target, and distributing a current density with respect to a volume of target tissue. An electrode may include a spear comprising a material with integrated conductive and insulative substances (e.g., conductive fibers in insulative composite material) and a geometry to dissipate kinetic energy after impact with the target.

6 Claims, 8 Drawing Sheets

ELECTRODE FOR ELECTRONIC WEAPONRY THAT DISSIPATES KINETIC ENERGY

BRIEF DESCRIPTION OF THE DRAWING

Embodiments of the present invention are described with reference to the drawing, wherein like designations denote like elements, and.

DETAILED DESCRIPTION OF THE PREFERRED EMBODIMENTS

U.S. patent application Ser. No. 12/983,163 filed Dec. 31, 2010, now U.S. Pat. No. 8,896,982 and U.S. patent application Ser. No. 14/301,594 filed Jun. 11, 2014 are herein incorporated by reference thereby making their disclosures a part of this application. The disclosures incorporated by references supplement the present disclosure and may be used for any purpose in the prosecution of the present application.

An electronic weapon, according to various aspects of the present invention, delivers a current through a human or animal target to interfere with locomotion by the target. An important class of electronic weapons launch at least one tethered electrode (e.g., dart, probe) toward a target to position the electrode in or near target tissue. A respective filament (e.g., wire with or without insulation) extends from the electronic weapon to each electrode at the target, thereby tethering the electrode to the electronic weapon. One or more electrodes may form a circuit through a target. The circuit conducts the stimulus signal. The circuit's return path may be through ground, through one or more additional tethered electrodes, or through a conductive path (e.g., liquid, plasma) formed by the electronic weapon to the target. The electronic weapon provides a stimulus signal (e.g., current, pulses of current) through, inter alia, the filament, the electrode, and the target to interfere with locomotion by the target. Interference includes causing involuntary contraction of skeletal muscles to halt voluntary locomotion by the target and/or causing pain to the target to motivate the target to voluntarily stop moving.

Another class of electronic weapons launch toward a target a wireless projectile (e.g., an XREP projectile marketed by TASER International, Inc.) having spears to position at least two of the spears in or near target tissue. One or more spears may form a circuit through a target. The circuit conducts a stimulus signal, as discussed above, generated within the projectile. The teachings of the present invention may be applied to a tethered electrode comprising a spear, shaft, target retainer, and/or tip. The teachings of the present invention may be applied to a projectile comprising a spear, shaft, target retainer, and/or tip. In the discussion that follows, the tethered electrode is described for clarity and as a sufficient basis for applying these teachings to a projectile.

Conventional stimulus signals may be used. For example, a stimulus signal may comprise about 19 current pulses per second at a duty cycle less than 1/400, repeated for a period of from 5 to 30 seconds to facilitate arrest of the target or escape from the target.

An electronic weapon, according to various aspects of the present invention, may include a launch device and one or more field replaceable deployment units mounted to the electronic weapon. The launch device may include propellant (single use or multiple use). Each deployment unit may include expendable (e.g., single use) components (e.g., tether wires, electrodes, propellant, projectiles), and storage cavities (e.g., bores, chambers). A projectile may be housed in a deployment unit.

A tethered electrode is an assembly of a filament (e.g., cord, wire, conductor, group of cords and/or conductors) and an electrode at least mechanically coupled to an end portion of the filament. A portion of the filament near the other end of the filament is at least mechanically coupled to the deployment unit and/or the launch device (e.g., one end fixed within the deployment unit), generally until the deployment unit is removed from the electronic weapon. As discussed below, mechanical coupling may facilitate electrical coupling of the launch device and the electrode prior to and/or during operation of the electronic weapon.

For an electronic weapon comprising one or more tethered electrodes, a launch device of the electronic weapon launches at least one tethered electrode of the electronic weapon toward a target. As the electrode travels toward the target, the electrode deploys (e.g., pulls) a length of filament from storage within the deployment unit. The filament trails the electrode. After launch, the filament spans (e.g., extends, bridges, stretches) a distance from the deployment unit to the electrode that is generally positioned in or near a target.

Electronic weapons that use tethered electrodes, according to various aspects of the present invention, include hand-held devices, apparatus fixed to buildings or vehicles, and stand-alone stations. Hand-held devices may be used in law enforcement, for example, deployed by an officer to take custody of a target. Apparatus fixed to buildings or vehicles may be used at security checkpoints or borders, for example, to manually or automatically acquire, track, and/or deploy electrodes to stop intruders. Stand-alone stations may be set up for area denial, for example, as used by military operations. Conventional electronic weapons such as the model X2 electronic control device marketed by TASER International, Inc., may be modified to implement the teachings of the present invention by replacing the conventional deployment units with deployment units having electrodes as discussed herein.

An electrode, according to various aspects of the present invention, provides a mass for launching toward a target. The intrinsic mass of an electrode includes a mass that is sufficient to fly, under force of a propellant, from a launch device to a target. The mass of the electrode includes a mass that is sufficient to deploy (e.g., pull, uncoil, unravel, draw) a filament from storage and/or pay out a filament from storage on or in the electrode. The mass of the electrode is sufficient to deploy a filament behind the electrode while the electrode flies toward a target. The mass of the electrode deploys the filament from storage and behind the electrode in such a manner that the filament spans a distance between the launch device and the electrode positioned at a target. The mass of an electrode is generally insufficient to cause serious blunt impact trauma to a target. In one implementation, the mass of an electrode that draws a filament from storage in a deployment unit is in the range of 2 to 3 grams, preferably about 2.8 grams.

An electrode provides a surface area for receiving a propelling force to propel the electrode away from a launch device and toward a target. Movement of the electrode away from the launch device is limited by aerodynamic drag and by a resistance force (e.g., tension in the filament) that resists deploying a filament from storage and pulling the filament behind the electrode in flight toward a target.

A forward portion of an electrode may be oriented toward a target prior to launch. Upon launch and/or during flight from the launch device toward the target, the forward portion of the electrode may orient toward the target. An electrode may have an aerodynamic form for maintaining the forward portion of the electrode oriented toward a target. The aerodynamic form of an electrode provides suitable accuracy for hitting the target. Accuracy is improved according to various aspects of the present invention by locating the center of mass of an electrode rearward of the midpoint of the length of the electrode.

An electrode includes a shape for receiving a propelling force to propel the electrode toward a target. A shape of an electrode may correspond to a shape of a portion of the launch device or deployment unit that provides a propelling force to propel the electrode. For example, a cylindrical electrode may be propelled from a cylindrical tube of a deployment unit. During a launch of an electrode by expanding gas, the electrode may seal the tube to accomplish suitable acceleration and muzzle velocity. A rear face of the cylindrical electrode may receive substantially all of the propelling force.

An electrode may include a substantially cylindrical overall shape. Prior to launch, such an electrode is positioned in a substantially cylindrical tube slightly larger in diameter than the electrode. A propelling force (e.g., rapidly expanding gas) is applied to a closed end of the tube. The force pushes against a rear portion of the electrode to propel the electrode out of an open end of the tube toward a target.

An electrode includes a shape and a surface area for aerodynamic flight for suitable accuracy of delivery of the electrode across a distance toward a target, for example, about 15 to 35 feet from a launch device to a target. An electrode may rotate in-flight to provide spin stabilized flight. An electrode may maintain its pre-launch orientation toward a target during launch, flight to, and impact with a target.

An electrode or fore portion of an electrode may have a conical or frustoconical shape (e.g., cone, golf tee, series of axially nested cones) with the base of the shape receiving the propelling force. In the golf tee shape, a series of cross-sections of the electrode proceeding from the tip have increasing area. In operation, increasing area slows penetration of the target clothing and/or tissue, resulting in shallower penetration as compared to prior art electrodes (e.g., electrodes used for about a decade with the model M26 electronic weapon marketed by TASER International, Inc.).

On impact, an electrode mechanically couples to a target. Mechanical coupling includes penetrating target clothing and/or tissue, resisting removal from clothing and/or tissue, remaining in contact with a target surface (e.g., tissue, hair, clothing, armor), and/or resisting removal from the target surface. Coupling may be accomplished by piercing, lodging (e.g., hooking, grasping, entangling, adhering, gluing), and/or wrapping (e.g., encircling, covering). An electrode, according to various aspects of the present invention, includes structure (e.g., hook, barb, spear, glue ampoule, tentacle, bolo) for mechanically coupling the electrode to a target. A structure for coupling may penetrate a protective barrier (e.g., clothing, hair, armor) on an outer surface of a target.

An electrode may include an integral structure or separate part functioning as a spear (e.g., cone, pointed shaft, needle). The spear penetrates target clothing and/or tissue up to the length of the spear (e.g. up to a face of the electrode). Penetration is arrested by friction (e.g., contact of the spear with target clothing or tissue, abutment of a face of the electrode and the target). A spear may extend away from a face of the electrode toward the target. The spear may include one or more barbs for increasing the strength of the mechanical coupling of the electrode to the target. The barbs may be arranged to accomplish suitable mechanical coupling at various lengths of penetration of clothing and/or tissue. A preferable arrangement of barbs permits each barb to attach to a different region about a longitudinal axis of the spear. For example 6 barbs arranged at 2, 3, 6, 7, 10, and 11 o'clock positions is preferred over 6 barbs arranged at only 2, 6, and 10 o'clock positions.

An electrode is mechanically coupled to a filament to deploy the filament from storage and to extend the filament from the launch device to the target. Mechanical coupling includes coupling a filament and an electrode with sufficient strength to retain the coupling during manufacture, prior to launch, during launch, after launch, during mechanical coupling of the electrode to a target, and while delivering a stimulus signal to a target. Mechanical coupling may be accomplished by confining the filament between surfaces of an electrode and/or confining the filament within a portion of the electrode (e.g., establishing a suitable stiction between a portion of the filament and one or more surfaces of an electrode). Confining may include enclosing, holding, retaining, maintaining mechanical coupling, and/or resisting separation. Confining may be accomplished by preventing or resisting movement or deformation (e.g., stretching, twisting, bending) of the filament. As discussed below, placing the filament in an interior and affixing a spear over the interior in one implementation confines the filament to the interior.

An electrode facilitates electrical coupling of the launch device and the target. Electrical coupling generally includes a region or volume of target tissue associated with the electrode (e.g., a respective region for each electrode when more than one electrode is used). According to various aspects of the present invention, one or more structures of the electrode accomplish lower current density in the region or volume compared to prior art electrodes.

For each electrode, electrical coupling may include placing the electrode in contact with target tissue (e.g. touching, inserting) and/or ionizing air in one or more gaps between the launch device, the deployment unit, the filament, the electrode, and target tissue. For example, a placement of an electrode with respect to a target that results in a gap of air between the electrode and the target does not electrically couple the electrode to the target until ionization of the air in the gap. Ionization may be accomplished by a stimulus signal that includes, at least initially, a relatively high voltage (e.g., about 25,000 volts for one or more gaps having a total length of about one inch). After initial ionization, the electrode remains electrically coupled to the target while the stimulus signal supplies sufficient current and/or voltage to maintain ionization. Ionization may not be needed, for instance when contact is accomplished by spreading involving direct conduction from a filament to the target.

Assembly of a tethered electrode, according to various aspects of the present invention, is reliably accomplished in less time and with fewer and/or different operations than employed by prior art techniques. Manufacturing cost savings may result.

An electrode, according to various aspects of the present invention, dissipates kinetic energy after initial contact with the target. Kinetic energy is generally imparted to the electrode by a propellant for flight to the target. An electrode may include a geometry suitable for deformation without separating into fragments. On impact with the target, such an electrode deforms (e.g., bends, collapses) where deformation of the geometry of the electrode dissipates energy. The electrode may exhibit resilience by substantially returning to its original shape. The electrode may retain some or all of the results of deformation. In addition to a fore portion of an electrode comprising a spear initially (primarily) contacting target clothing and/or tissue, deformation may facilitate impact of another portion (e.g., side portion, aft portion) of the electrode with target clothing and/or tissue. Such secondary impact also absorbs kinetic energy that otherwise would propel the fore portion of the electrode further into target tissue.

An electrode for use with a deployment unit and/or an electronic weapon, according to various aspects of the present invention, performs the functions discussed above. For example, any of electrodes 142, 143, 686, 696, and 700 of FIGS. 1-3 and 6-10 may be launched from weapon 100 toward a target to establish a circuit with the target to provide a stimulus signal through the target.

Figure 1:
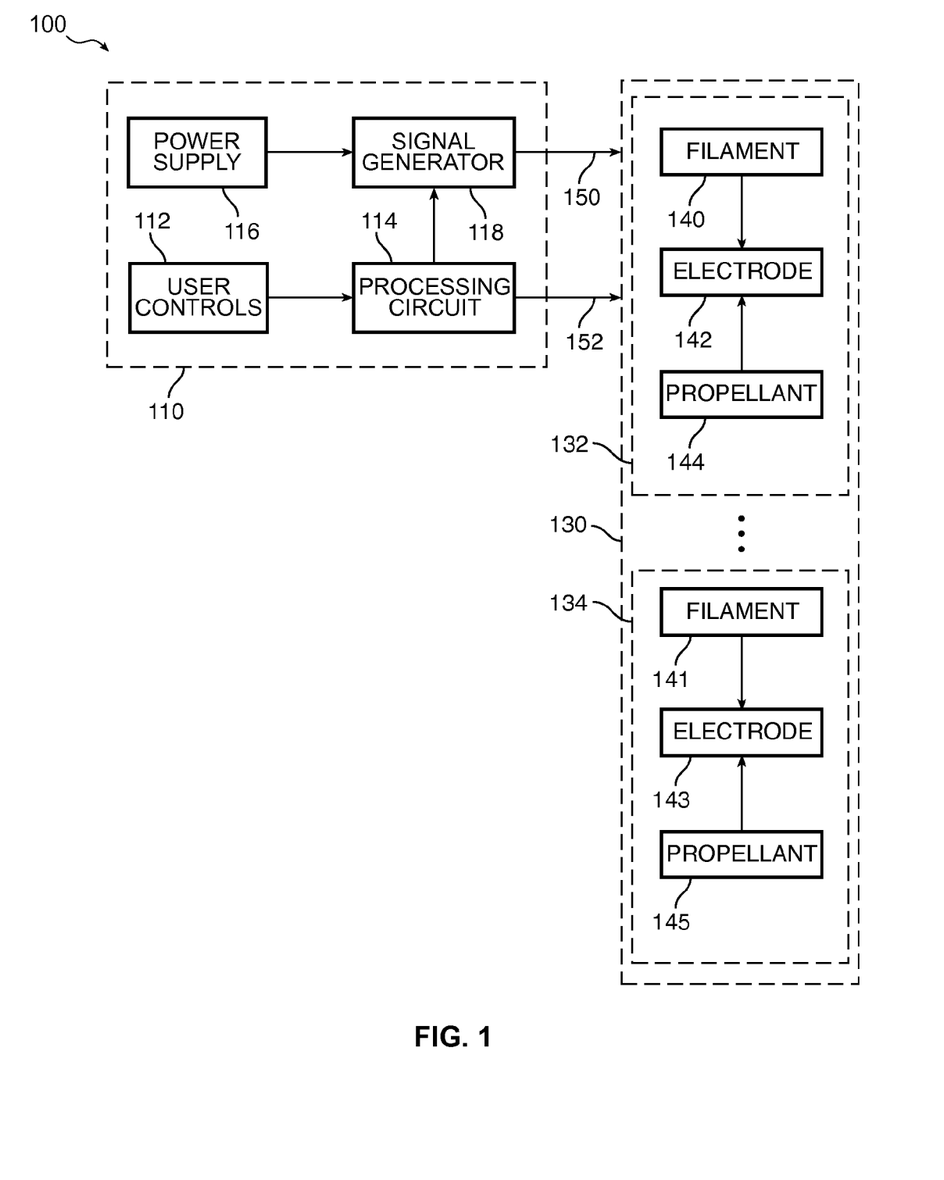
FIG. 1 is a functional block diagram of an electronic weapon according to various aspects of the present invention.

Electronic weapon 100 of FIG. 1 includes launch device 110 and deployment unit 130. Launch device 110 includes user controls 112, processing circuit 114, power supply 116, and signal generator 118. In one implementation, launch device 110 is packaged in a housing. The housing may include a mechanical and electrical interface for a deployment unit 130. Conventional electronic circuits, processing circuit programming, propulsion technologies, and mechanical technologies may be used, suitably modified, and/or supplemented as discussed herein.

In operation, a user control is operated by a user to initiate an operation of the weapon. User controls 112 may include a trigger, a manual safety, and/or a touch screen user interface operated by a user. When user controls 112 are packaged separately from launch device 110, any conventional wired or wireless communication technology may be used to link user controls 112 with processing circuit 114.

A processing circuit controls many if not all of the functions of an electronic weapon. A processing circuit may initiate a launch of one or more electrodes responsive to a user control. A processing circuit may control an operation of a signal generator to provide a stimulus signal. For example, processing circuit 114 receives a signal from user controls 112 indicating user operation of the weapon to launch an electrode and provide a stimulus signal. Processing circuit 114 provides a launch signal 152 to deployment unit 130 to initiate launch of one or more electrodes. Processing circuit 114 may provide a signal to signal generator 118 to provide the stimulus signal to the launched electrodes. Processing circuit 114 may include a conventional microprocessor and memory that executes instructions (e.g., processor programming) stored in memory.

A power supply provides energy to operate an electronic weapon and to provide a stimulus signal. For example, power supply 116 provides energy (e.g., current, pulses of current) to signal generator 118 to provide a stimulus signal. Power supply 116 may further provide power to operate processing circuit 114 and user controls 112. For hand held electronic weapons, a power supply generally includes a battery.

A signal generator provides a stimulus signal, as discussed above, for delivery through a target. A signal generator may reform energy provided by a power supply to provide a stimulus signal having suitable characteristics (e.g., ionizing voltage, charge delivery voltage, charge per pulse of current, current pulse repetition rate) to interfere with target locomotion. A signal generator electrically couples to a filament to provide the stimulus signal through the target as discussed above. For example, signal generator 118 provides a stimulus signal to tethered electrodes 142-143 of deployment unit 130 via their respective filaments 140-141. Signal generator 118 is electrically coupled via stimulus interface 150 to filaments stored in deployment unit 130. The stimulus signal may consist of from 5 to 40 pulses per second, wherein each pulse is capable of ionizing air, and each pulse is capable of delivering after ionization (if needed) about 80 microcoulombs of charge through a human or animal target having an impedance of about 400 ohms.

A deployment unit (e.g., cartridge, magazine) receives a launch signal from a launch device to initiate a launch of one or more electrodes and a stimulus signal to deliver through a target. A spent deployment unit may be replaced with an unused deployment unit after some or all electrodes of the spent deployment unit have been launched. An unused deployment unit may be coupled to the launch device to enable additional electrodes to be launched. A deployment unit may receive, via an interface, signals from a launch device to perform the functions of a deployment unit.

For example, deployment unit 130 may include one or more deployment units 132-134. Each deployment unit 132 (134) may include one or more filaments 140 (141), one or more electrodes 142 (143), and one or more propellants 144 (145). A deployment unit stores a filament for each electrode or group of electrodes. Each filament mechanically couples to an electrode or group of electrodes as discussed herein. Via launch signal 152, processing circuit 114 initiates activation of propellant 144 (145) for one or more electrodes. Each propellant 144 (145) propels one or more electrodes 142 (143) toward a target. Each electrode is coupled to deploy a respective filament from storage. As each electrode flies toward the target, each electrode deploys its respective filament out from its storage. Signal generator 118 provides the stimulus signal in a conventional manner through the target via stimulus interface 150 and the filaments coupled to launched electrodes 142 (143).

Each propellant may serve to launch any number of electrodes. For instance, a deployment unit formed as a replaceable deployment unit may include a housing, an electrical interface, two electrodes, one propellant for launching the two electrodes, and two filaments, one for each electrode.

An electrode, according to various aspects of the present invention, may perform one or more of the following functions in any combination: binding the filament to the electrode, deploying the filament, mechanically coupling the electrode to a target, enabling conduction of the stimulus current from the filament through the target, spreading a current density with respect to a region of target tissue, and diffusing a current into a volume of target tissue. Enabling conduction includes ionizing, spreading, and/or diffusing. Enabling conduction, may include ionization along or through insulative and/or composite material of one or more portions of the electrode. Enabling conduction may include ionization along or through insulative and/or composite material external to the electrode. Insulative materials include any material or substance (e.g., gas, liquid, solid, aggregation, suspension, composite, alloy, mixture) that presents, at any time or times, a relatively high resistance to current of the stimulus signal. Composite materials include insulative materials combined with conductive particles, layers, or fibers.

In operation with a target, an electrode conducts current in a circuit that includes the target and a signal generator. For example, circuit 200 of FIG. 2 includes filament 202, electrode 204, target tissue 206, and return path 208. For example, when electronic weapon 100 is operated to launch electrode 142 at a target, a circuit similar to circuit 200 may be formed where filament 202 corresponds to filament 140, electrode 204 corresponds to electrode 142. Return path 208 in one implementation includes a conductor common to the signal generator and the target (e.g., earth). The return path in another implementation, not shown, includes a second tethered electrode (e.g., corresponding to filament 141 and electrode 143). Current of any conventional polarity or polarities may flow in one or more directions on any of the lines shown in FIG. 2 at various times.

An electrode has mass, shape, and surfaces for being attached to a filament, for being propelled, and for deploying the filament to a target, as discussed above. Conventional mass, shape, and surfaces may be employed. For example, an electrode may have a substantially cylindrical shape, an interior with surfaces that abut and/or grip a filament, and external surfaces with suitable aerodynamic properties for efficient propulsion and accurate flight to a target. An electrode may employ conductive, resistive, composite and/or insulative material on an intended path of conduction or propagation of stimulus current. An electrode may employ resistive, insulative, and/or composite material to diminish stimulus current conduction on undesired paths. An electrode may be rigid. To avoid breaking on impact, an electrode may have portions designed to flex to absorb energy of impact and thereby reduce the risk of breakage. Conventional metal and/or plastic fabrication technologies may be used in the manufacture of an electrode as discussed herein. Plastics may be filled with other materials (e.g., conductive particles, fibers, layers) to form composite materials uniformly or in suitable portions of a part. Conventional filling materials and formulation technology may achieve desired mechanical characteristics, electrical conductivity, or both.

An electrode may have any size and shape known in the art for suitably binding a filament and deploying a filament (e.g., substantially spherical, substantially cylindrical, having an axis of symmetry in the direction of flight, bullet shaped, tear drop shaped, substantially conical, golf tee shaped). In various implementations, an electrode may be formed of conductive, resistive, insulative, and/or composite materials, as discussed above. If insulative, a body portion of an electrode (i.e., all structures except those functioning as a spear, target retainer, or tip) may comprise composite material and/or be coated with insulative material.

A spear may perform mechanical coupling and/or be activated as discussed above. A spear may have any size and shape known in the art for suitably piercing material and/or tissue of a target, lodging in material and/or tissue of a target, and forming an ionized path from the tip of the spear to target tissue. In various implementations, a spear may be formed of conductive, resistive, insulative, and/or composite materials. A spear may be partially or entirely formed of a material that electrically insulates. When insulative, the electrode may comprise composite material and/or be coated with insulative material. Activation and use of a shaft and/or tip may reform paths along and/or through the insulative or composite material.

An insulator may be of a type (e.g., thickness, material, structure) that electrically insulates the spear against a current having a voltage below a threshold, but fails to insulate the spear against a current having a voltage above the threshold. An insulator may be formed (e.g., shaped, applied, positioned, removed, partially removed, cut) to establish a likely location on the spear where the insulator may fail to insulate against a current having a voltage above a threshold. An insulator may define a series of gaps between conductors of the spear or conductive portions of the spear. The gaps may act as switches operative to conduct in response to the applied voltage of the stimulus signal.

A tip (e.g., point, cone, apex comprising acute angles between faces, end of a shaft of relatively small diameter) operates to pierce an outer surface (e.g., layer) of a target and/or target tissue. A tip of a spear facilitates mechanical coupling by piercing and lodging. A tip when insulated may operate as a gap or switch interfering with current flow (e.g., blocking) until a threshold voltage breaks down the insulator and/or permits ionization near the tip followed by current flow through the tip.

A barb operates to lodge (e.g., retain) an electrode in clothing, armor, and/or tissue of a target to retain a mechanical coupling between the barb and the target. A barb portion of a spear resists mechanical decoupling (e.g. separation or removal from the target). A spear may include a barb near the tip. A spear may include a plurality of barbs arranged at increasing distance from the tip. A barb may include a continuous surface of the spear (e.g., a helical channel or ridge, a screw thread or channel, a surface having an undulation that increases friction between the barb and the target.

According to various aspects of the present invention, an electrode may comprise several structures that are coupled together to complete assembly of the electrode. These structures, when independent objects, are herein called parts, as opposed to portions of the same object.

Receiving and conducting the stimulus signal is herein called activation. Activation of a region of an electrode, spear, shaft, or tip is achieved at a respective activation voltage. According to various aspects of the present invention, activation voltages relative to the voltage of a filament increase in proportion to distance toward the tip. In an exemplary implementation, increasing activation voltages are achieved in composite materials due to non-overlapping conductive filler materials. When non-overlapping, ionization occurs between at least some of the filler materials (e.g., particles, fibers).

Figure 3:
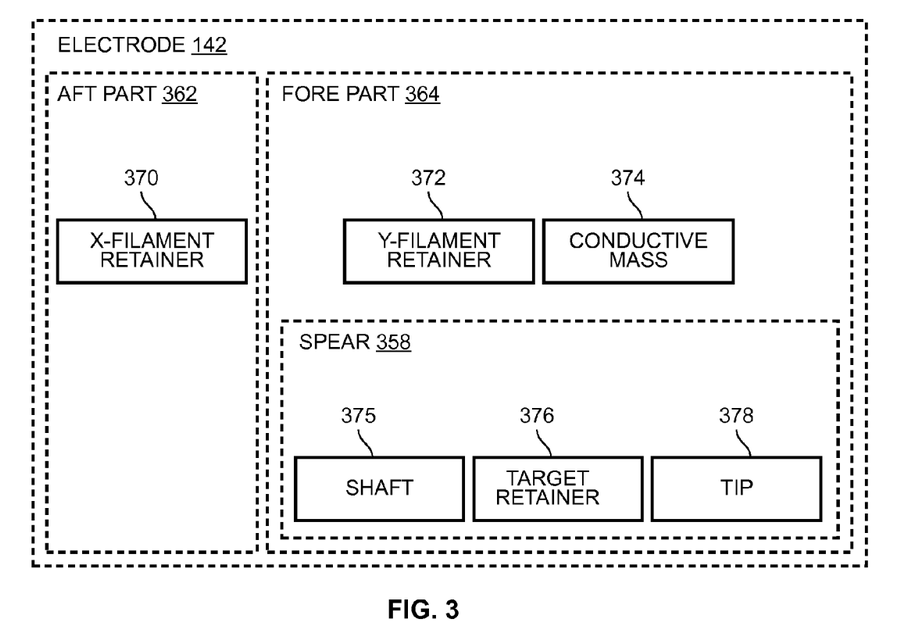
FIG. 3 is a functional block diagram of an electrode for the electronic weapon of FIG. 1.

A functional block diagram of an electrode, according to various aspects of the present invention, illustrates functional and structural cooperation. For example, electrode 300 of FIG. 3 is an implementation of electrode 142, discussed above. Electrode 300 includes aft part 362 and fore part 364. An aft part and a fore part may be mechanically coupled together. An aft part carries a filament and/or retains a filament. A fore part pierces clothing and/or tissue of a target to mechanically couple an electrode to a target.

Figure 2:
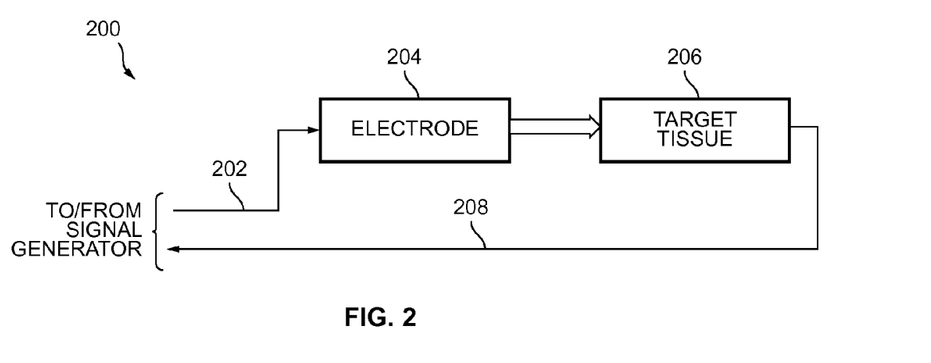
FIG. 2 is a functional block diagram of a circuit that includes a target and an electrode of the electronic weapon of FIG. 1.

A fore part pierces clothing or target tissue to form and to mechanically maintain the electrical circuit discussed with reference to FIG. 2. A fore part may retain a filament as discussed above and may electrically couple a filament to the target by positioning the filament proximate to the target. A fore part may be implemented as an integral monolithic structure formed of one material. A fore part may include a spear as a separate part or formed of a different material that is combined or assembled to form the complete fore part. For example, fore part 364 performs the functions of an electrode discussed above in cooperation with aft part 362.

Aft part 362 includes X-filament retainer 370. Fore part 364 includes Y-filament retainer 372, mass 374, and spear 358. Spear 358 includes shaft 375, target retainer 376 and tip 378. Fore part 364 may be formed as one integral component of electrode 300. In other implementations, fore part 364 comprises a first component providing the functions of Y-filament retainer 372 and mass 374 and a second component providing the functions of spear 358. In such an implementation, the first component is formed of relatively rigid, massive material and the second component is formed of relatively deformable, less dense material. In a preferred implementation, both components comprise resin filled with non-overlapping conductive material. First and second components may be fastened together in any conventional manner (e.g., compression fit, adhered) or formed in a conventional sequential molding process.

In implementations according to the functional block diagram of FIG. 3, electrode 300 performs the functions of an electrode as discussed above. Electrode 300 is assembled by fastening aft part 362 to fore part 364 using any conventional technology. In one implementation, X-filament retainer 370 and Y-filament retainer 372 include latching features that retain the filament to electrode 300 and secure the assembly of aft part 362 and fore part 364. Electrode 300 of FIG. 3 may be assembled by combining aft part 362 and fore part 364 on an axis. For example, when X-filament retainer 370 has a first axis and Y-filament retainer 372 has a second axis, these retainers may be aligned to an alignment axis and then moved together along the alignment axis to accomplish assembly of the two parts.

Aft part 362 includes X-filament retainer 370. X-filament retainer 370 mechanically retains the filament to enable electrode 300 to deploy the filament when electrode 300 is deployed. Retention may include any fastening technology (e.g., screw threads, bayonet type, snap, latch), binding technology (e.g., friction fitting, staking), and/or joining technology (e.g., sonic welding, adhesives), for example, as discussed above, that is suitable for reliably securing a filament to the carrying part. Binding by friction facilitates relatively low manufacturing cost, mechanical reliability, and ease of manual and/or automated assembly of electrode 300. In one implementation, X- and Y-filament retainers bind a filament when abutted against each other. Any conventional two-part retention technology may be used (e.g., fastening, binding, joining) between an end of a filament, X-filament retainer, and Y-filament retainer.

Fore part 364 may include substantially all of the mass of electrode 300 (e.g., greater than 80%, about 90%) Such a mass distribution may inhibit tumbling of electrode 300 during launching and/or deployment. Mass 374 provides a majority of the mass of fore part 364. Mass 374 may comprise a material of greater density than materials of other portions of fore part 364. Mass 374 may comprise one or more cylinders, discs, rings, bobbins, or sleeves. Mass 374 may comprise resin with particles and/or fibers of denser material (e.g., carbon, graphite, metal, copper, brass, stainless steel). Mass 374 may be formed or assembled on or about a post of fore part 364.

A front face of an electrode resists further penetration of electrode 300 into a target. A front face having dimensions larger than the diameter of shaft 375 stops penetration of shaft 375 by abutting target clothing or tissue. A front face, as discussed above, of fore part 364 may be provided by mass 374 and/or spear 358.

Fore part 364 performs the functions discussed above with reference to a spear. A spear performs the piercing function of a fore part of an electrode. A spear may also perform a retaining function to mechanically retain the electrode in contact with the target (e.g., by maintaining a relative position of the piercing part with respect to the target). For example, spear 358 includes shaft 375, target retainer 376, and tip 378. A shaft supports a target retainer and a tip. A shaft and tip cooperate to accomplish piercing to a desired depth. The shaft is generally suitable for penetration of clothing and/or target tissue. The length of the shaft may locate the tip a desired distance from a front face of the electrode, as discussed above, so that only the shaft and tip penetrate target clothing and/or tissue when the face abuts the target. The shaft may flex a suitable amount on impact to dissipate kinetic energy. Spear 358 may be integral to fore part 364. Spear 358 may be combined or assembled with fore part 364 using conventional technologies.

A target retainer resists removal of the spear from the target. A target retainer may be implemented with one or more barbs arranged behind the tip.

A tip includes any structure that pierces target clothing and/or tissue. A tip may include one or more points front-facing toward the target. A tip may be formed with a target retainer immediately behind the tip (e.g., barb, rear-facing point).

Fore part 364 may include a shaft to position tip 378 a suitable distance in front of a face of fore part 364. In another implementation, a face is omitted because kinetic energy at impact is dissipated to an extent that spear 358 does not penetrate target clothing and/or tissue for the full length of spear 358.

Electrode 300 of FIG. 3 may be activated by a voltage via filament 140 (not shown) for current flow to and/or from signal generator 118. Electrode 300 may be activated by a voltage for current flow to and/or from target tissue (not shown in FIG. 3). Currents may pass via one or more paths through electrode 300 and via one or more paths through target tissue. Activation of any particular region of electrode 300 may be accomplished with a voltage at filament 140 that exceeds a threshold value for that region, also referred to as an activation voltage. The activation voltage for a first region of the fore part (e.g., region of shaft 375, region of the target retainer 376) may be less than an activation voltage for a second region of the fore part (e.g., tip 378).

Electrode 300 of FIG. 3 may be implemented to provide spreading of the type described in US Patent Application Publication 2011/0176250 by Heinz, incorporated herein by this reference for all that it discloses. For example, an end of filament 140 may be positioned at or near a front face of electrode 300. Either or both parts of each electrode design may support propagation of electricity from the filament to the target. For example, either or both parts may comprise non-insulative materials (e.g., conductive, resistive, composite).

Electrode 300 of FIG. 3 may be implemented to provide diffusing of the type described in US Patent Application Publication 2011/0176250 by Heinz incorporated herein by this reference for all that it discloses. For example, material forming a front face, spear, shaft, target retainer, and/or tip may comprise non-insulative materials (e.g., conductive, resistive, composite) and/or structures of the type described by Heinz.

One or more portions of electrode 300 may deliver current to target tissue by diffusing the total current. Spear 358 may diffuse current into target tissue. For example, to reduce a current delivered through tip 378, current may diffuse into target tissue through target retainer 376 and/or shaft 375. Diffusion may be facilitated by forming spear 358, target retainer 376, and/or shaft 375 of insulative or conductive material. In operation, an electric field density at tip 378 is reduced by current delivery to target tissue at other regions of spear 358. Diffusion generally occurs when a region of spear 358 has an activation voltage less than an activation voltage of tip 378. Differing activation voltages result when spear 358 is formed of insulative material (e.g., composite material, conductive resin, resin filled with non-overlapping conductive fibers and/or particles).

Figure 4:
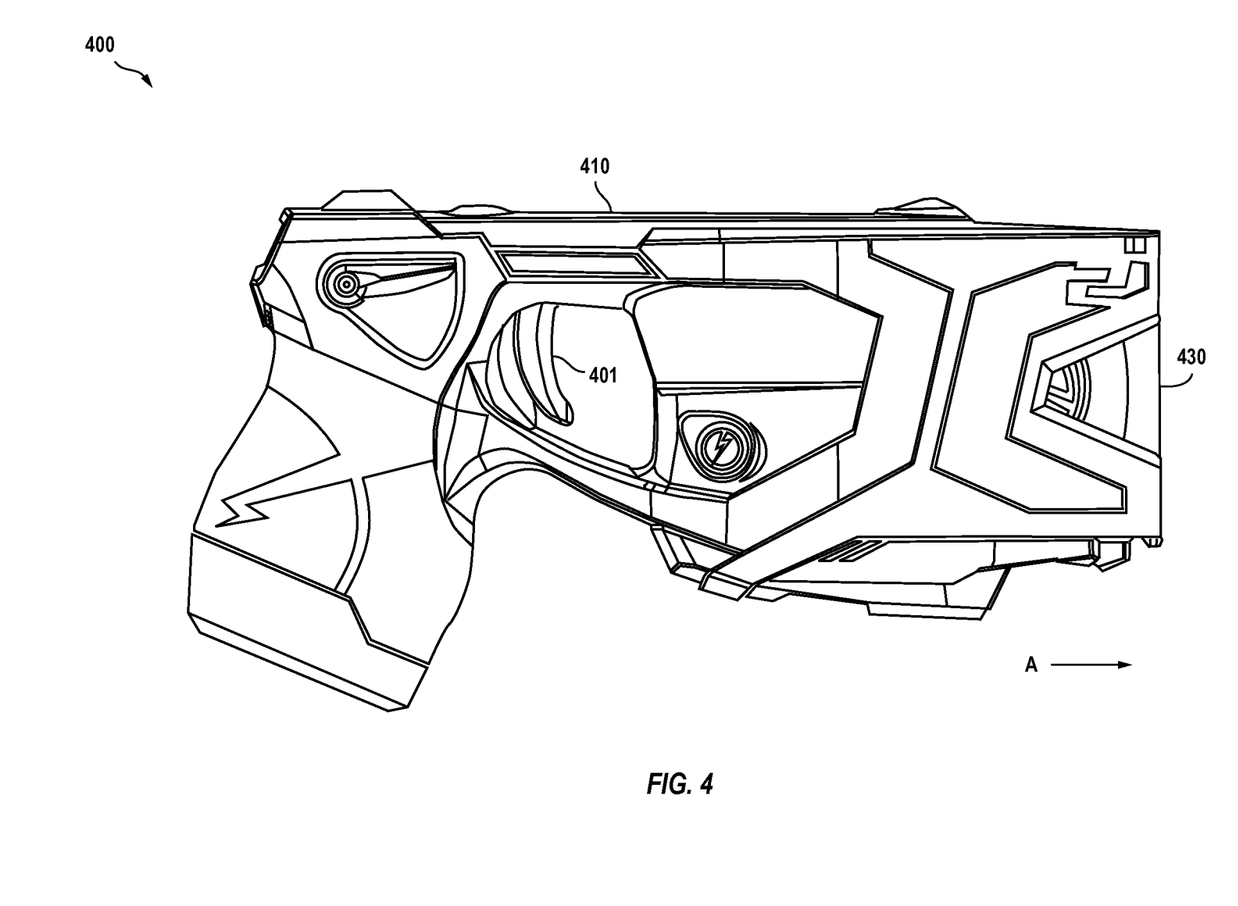
FIG. 4 is a side plan view of an implementation of the electronic weapon of FIG. 1.

An electronic weapon, according to various aspects of the present invention, launches electrodes of the type discussed above. For example, electronic weapon 400 of FIG. 4 is an implementation of electronic weapon 100. Electronic weapon 400 includes a hand-held launch device 410 that receives and operates two field-replaceable deployment units (one shown) 430 housing electrodes. Launch device 410 is an implementation of launch device 110. Launch device 410 includes a power supply (having a replaceable battery), a processing circuit, and a signal generator as discussed above. Launch device 410 may be of the type known as a model X2 electronic control device marketed by TASER International, Inc., modified to include electrodes according to various aspects of the present invention.

Deployment unit 430 is an implementation of deployment unit 130. Deployment unit 430 includes two tethered electrodes, filaments, and a common propellant to substantially simultaneously deploy two electrodes. Upon operation of trigger 401, both electrodes (shown on FIG. 6) are propelled from deployment unit 430 generally in direction of flight "A" toward a target (not shown).

Figure 5:
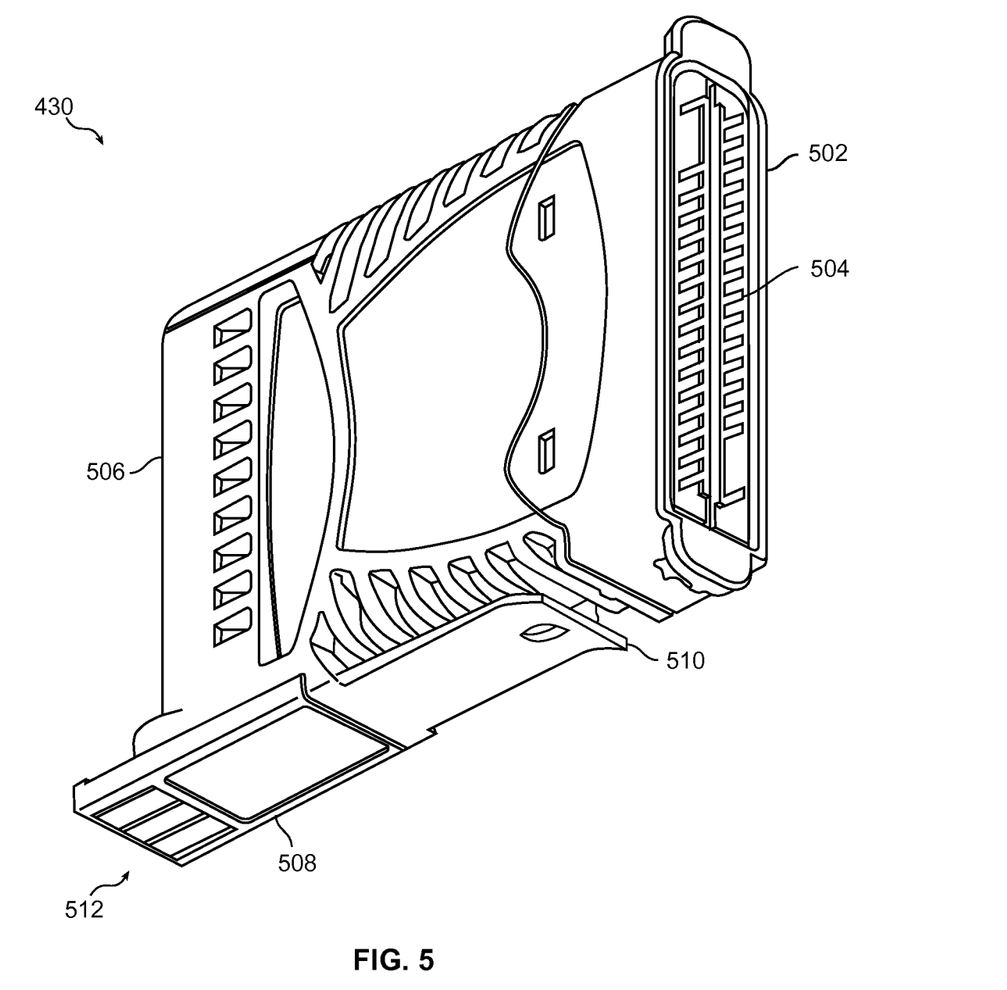
FIG. 5 is a perspective plan view of a deployment unit of the electronic weapon of FIG. 4.
Figure 6:
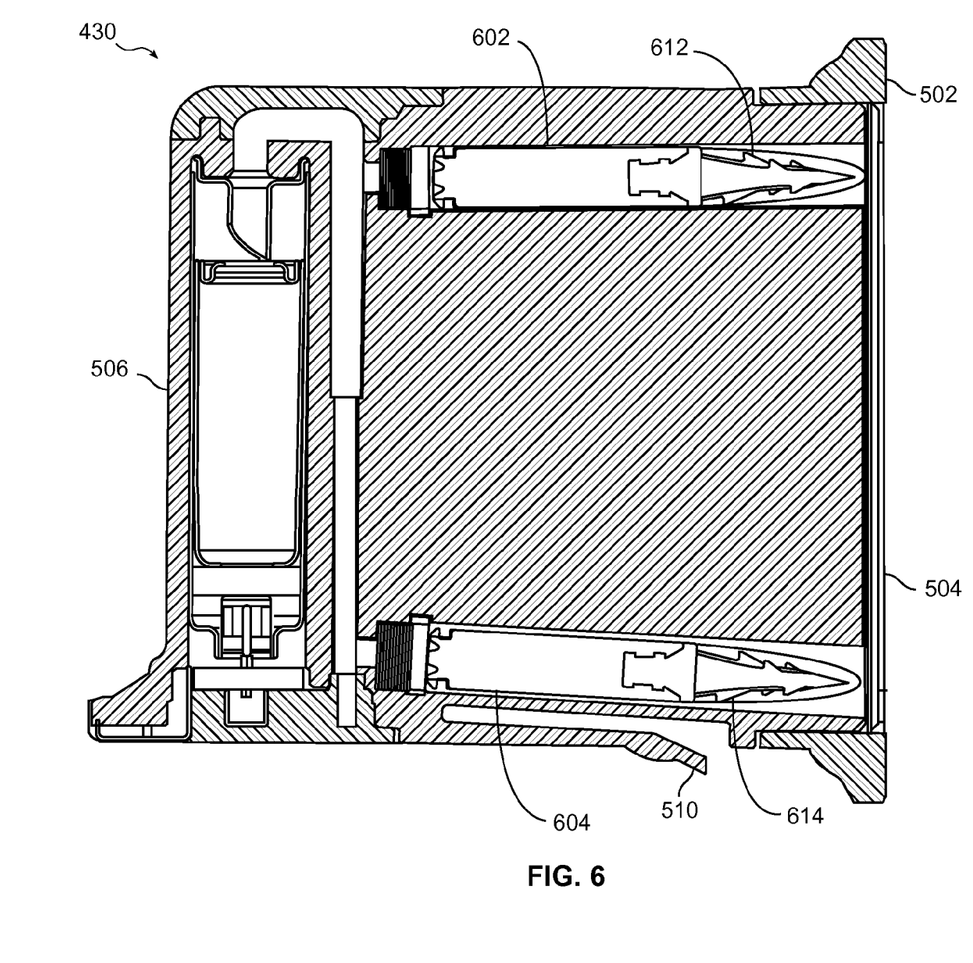
FIG. 6 is a cross-section of the deployment unit of the electronic weapon of FIG. 5.

Deployment unit 430 of FIGS. 5 and 6 contains electrodes in an implementation of electrodes 300 of FIG. 3. At front 502 of unused single-use deployment unit 430, cover 504 covers launch tubes containing two electrodes. Rear portion 506 of deployment unit 430 is inserted first into launch device 410. Electrical coupling of deployment unit 430 and launch device 410 is accomplished via interface 512 in base portion 508. Mechanical coupling of deployment unit 430 and launch device 410 is accomplished via latch 510. Deployment unit 430 may be of the type known as a Smart Cartridge marketed with the model X2 electronic weapon by TASER International, Inc., modified to include electrodes according to various aspects of the present invention.

Launch tubes of deployment unit 430 hold electrodes 602 and 604 of FIG. 6. Electrodes 602 and 604 are implementations of electrode 300 discussed above. For improved accuracy, a tip of electrode 602 (604) does not apply force directly against cover 504. Instead, ram 612 (614) transfers force from a face of electrode 602 (604) onto cover 504 to open the cover during launching of the electrodes. Spaces for filament storage are not shown in FIG. 6 because the central cross-section of FIG. 6 bisects a central wall between two respective wire storage spaces.

In operation, a propellant explosively provides a volume of gas that pushes each electrode from the respective tube in a manner functionally identical to operation of the cartridge described in US Patent Application Publication 2012/0002344 filed Jun. 30, 2010 by Klug.

As electrodes 602 and 604 fly toward the target, electrodes 602 and 604 deploy behind them respective filaments. Electrodes 602 and 604 mechanically and electrically couple to tissue of the target. When electrodes 602 and 604 are positioned in or near the target, filaments extend from deployment unit 430 to electrodes 602 and 604 respectively. The signal generator of launch device 410 provides a stimulus signal through the circuit formed by filaments, electrodes, and target tissue as discussed above with reference to FIG. 2.

Portions and/or parts of an electrode, as discussed above, may be formed, according to various aspects of the present invention, of materials that are not highly conductive. These materials are discussed above as resistive, insulative, and composite. The structure of these materials may be uniform through a volume or nonuniform. When uniform, electrical activation may be in accordance with a resistance per unit length and one or more lengths of conduction (path lengths) needed to accomplish suitable activation. Nonuniformity may be accomplished by varying the blend of constituents of the material when molding the desired structure, or by arranging materials of different properties in electrically series or electrically parallel assembly. Nonuniformity may cause resistance to increase away from the target or to any desired nonlinear extent. Conductive and/or resistive materials may be combined with insulative materials in any conventional fashion.

Insulative materials include nonconductors. When exposed to ionization voltages, portions of insulative materials along paths of ionization may reform (e.g., wear, deform, mobilize, melt, vaporize, temper, congeal, crystallize, stratify, reconstitute) into resistive materials, voids, and/or pockets of component materials (e.g., liquids or gases). Reformed insulative materials are examples of resistive or non-insulative materials. Reformation may change a magnitude of voltage needed for a desired activation. Insulative materials may comprise plastic, nylon, fiberglass, or ceramic. Insulative coatings include lacquer, black zinc, a dielectric film, a non-conductive passivation layer, a polyp-xylylene polymer (e.g., Parylene), polytetrafluoroethylene (e.g., Teflon), a thermoplastic polyamide (e.g., Zytel). Conventional insulative technologies may be used.

Insulative materials of a type herein called composite materials may include non-overlapping (at least some separated) conductors. Conventional composite materials are manufactured and used for molding and overmolding. For example, a composite material may be formed from a liquid resin, plastic, or thermoplastic as a host material with solid fibers, spheres, ellipsoids, powder, or other particles as filler mixed into the host before the host cures to a solid. Host material may be plastic, nylon, PEEK (polyetheretherketone), thermoplastic elastomer (e.g., thermoplastic polyurethane (TPU)), SBS poly(styrene-butadiene-styrene) rubber. Particles of conductive (e.g., metal, stainless steel, tungsten) or resistive (e.g., carbon) material may be used as filler. Particles having a coating of conductive or resistive material may be used as filler. For example, insulative material of the type marketed by RTP Co. as thermoplastic polyurethane elastomer (TPUR/TPU) comprising nickel-coated carbon fiber may be used. Spheres or powder may have a diameter of from about 3 to about 11 microns. Fibers may have a similar diameter and a length of from about 5 to about 7 millimeters. Filler to host by weight may be from about 5% to about 40% to assure separation (nonoverlap) of most of the fibers and/or particles. Composition may result in activation voltages of from about 50 volts to about 6000 volts for components of electrode 300. In operation at voltages expected to be sufficient for ionization between nonoverlapping fibers and/or particles, composite materials perform as non-insulative material.

Figure 7:
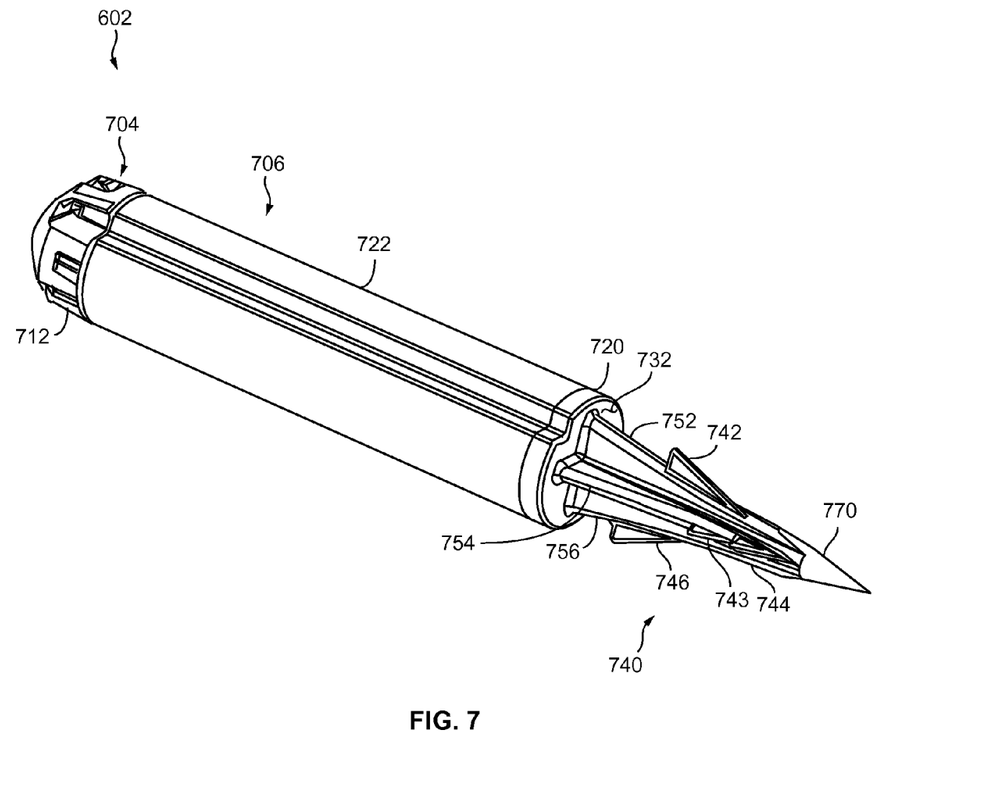
FIG. 7 is a perspective plan view of an implementation of the electrode of FIG. 3.

Electrode 602, of FIGS. 7-10, is substantially cylindrical as shown in the perspective view of FIG. 7. Electrode 602 includes aft part 704, X-filament retainer 712, fore part 706, mass 722, Y-filament retainer 902, spear 720, front face 732, target retainer 740, and tip 770. Target retainer 740 includes barbs 742, 743, 744, and 746. Spear 720 includes ribs 752, 754, 756, and 812. When launched and after impact with a target, ribs 752 and 756 remain in a substantially vertical plane and ribs 754 and 812 remain in a substantially horizontal plane. The planes at launch are generally not the planes at impact due to many ballistic factors. Nonetheless, electrode 602 does not spin in flight. With respect to each other, aft part 704 may be formed of comparably less flexible (rigid, brittle), dense composite material and fore part 706 may be formed of comparably flexible (malleable, resilient), less dense composite material.

X-filament retainer and Y-filament retainer may be of the type described in US Patent Application Publication US 2012/0170167 filed Dec. 31, 2010 by Beechey. In operation, a filament (not shown) is retained with an uninsulated end of the filament near mass 722. Mass 722 is formed of composite material, as discussed above, and when activated conducts the stimulus signal from the filament to spear 720. Spear 720 is also formed of composite material and when activated may conduct, spread, and/or diffuse current of the stimulus signal into target tissue.

Fore part 706 includes mass 722 overmolded onto spear 720. Mass 722 may be formed of a composite material prepared with conventional technologies having a novel combination of properties for electronic weapon electrodes as stated in TABLE 1.

TABLE 1

| Property | Value or Range | Test Method |
| --- | --- | --- |
| Tensile Strength (Yield) | about 6,600 PSI | ASTM D638 |
| Tensile elongation | about 1% to Break | ASTM D638 |
| Tensile Modulus | about 2,400,000 PSI | ASTM D638 |
| Flexural Strength (Yield) | 10,200 PSI minimum | ASTM D790 |
| Flexural Modulus | about 2,110,000 PSI | ASTM D790 |
| Volume Resistivity | 10-30 ohm-cm | ASTM D257 |
| Surface Resistivity | 40-77 ohm/sq | ASTM D257 |

Spear 720 includes a geometry (shape) comprising a curve similar to a golf tee from front face 732 to tip 770. The geometry also includes four ribs (752, 754, 756, and 812) in two orthogonal planes, each plane including the central longitudinal axis 802 of cylindrical symmetry of electrode 602. The cross-section of spear 720 in FIG. 8 taken between front face 732 and barb 746. This cross-section is a member of a series of cross-sections of spear 720 that could be taken beginning near tip 770 and ending near the front face 732. That series would be characterized by an increasing area of spear material (without counting material of the barbs). Such an increase slows spear penetration, as discussed above.

In other implementations, a spear may include more or fewer ribs. For example, a spear with three ribs may exhibit a triangular cross-section with ribs spaced at about 120 degrees. Rib spacing may be nonuniform (e.g., from about 20 degrees to about 170 degrees).

One or more ribs may be formed about a central longitudinal axis of the spear in an open configuration (e.g., spiral) or a closed configuration (e.g., circular, polygonal, wavy oval, ragged polygon). Ribs may be formed with intersections among the ribs.

A rib may comprise an undulation of the surface of the spear (e.g., dome). A rib may extend substantially all of the length of the spear. A rib may extend a partial length of the spear, for example, where bending is desired.

Figure 8:
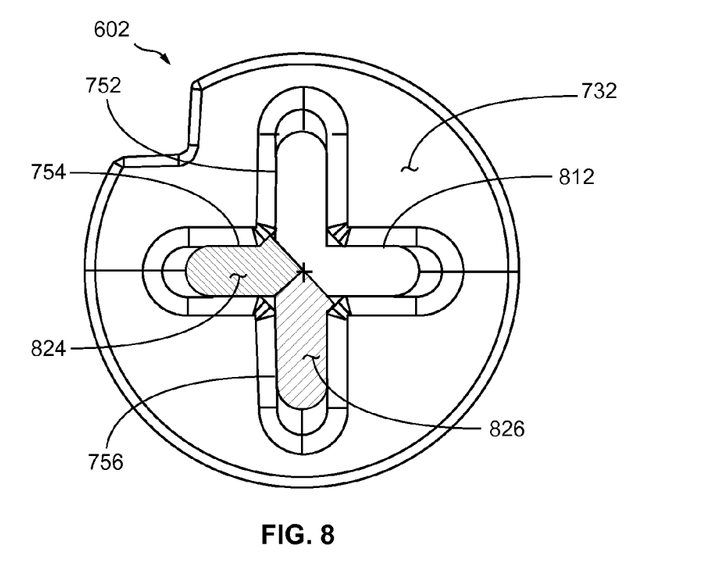
FIG. 8 is a cross-section of the spear of the electrode of FIG. 7 drawn to scale.

The width of a rib may be a small fraction of a circumference of the spear as shown in FIG. 8. In other implementations, a rib may be a substantial fraction of the circumference (e.g., up to about 170 degrees).

Spear 720 may be formed of a composite material prepared with conventional technologies having a novel combination of properties for electronic weapon electrodes as stated in TABLE 2.

TABLE 2

| Property | Value or Range | Test Method |
| --- | --- | --- |
| Tensile Strength (Yield) | 7,000 PSI minimum | ASTM D638 |
| Tensile elongation | 10% to Yield minimum | ASTM D638 |
| Tensile Modulus | 600,000 PSI minimum | ASTM D638 |
| Flexural Strength (Yield) | 11,000 PSI minimum | ASTM D790 |
| Flexural Modulus | 700,000 PSI minimum | ASTM D790 |
| Volume Resistivity | 10-30 ohm-cm | ASTM D257 |
| Surface Resistivity | 40-77 ohm/sq | ASTM D257 |

The geometry of spear 720, as shown in the cross-section of FIG. 8, includes area 824 of rib 754 and area 826 of rib 756. Area 826 is larger than area 824. Ribs of spear 720 are arranged with cylindrical symmetry about an axis 802 (shown as a center of cross-section in FIG. 8). Due to the difference in representative areas 824 and 826, ribs 752 and 756 resist bending to a greater extent than ribs 754 and 812. The difference in representative areas is a characteristic of a plurality of cross-sections of spear 720 as shown in FIG. 9.

Figure 9:
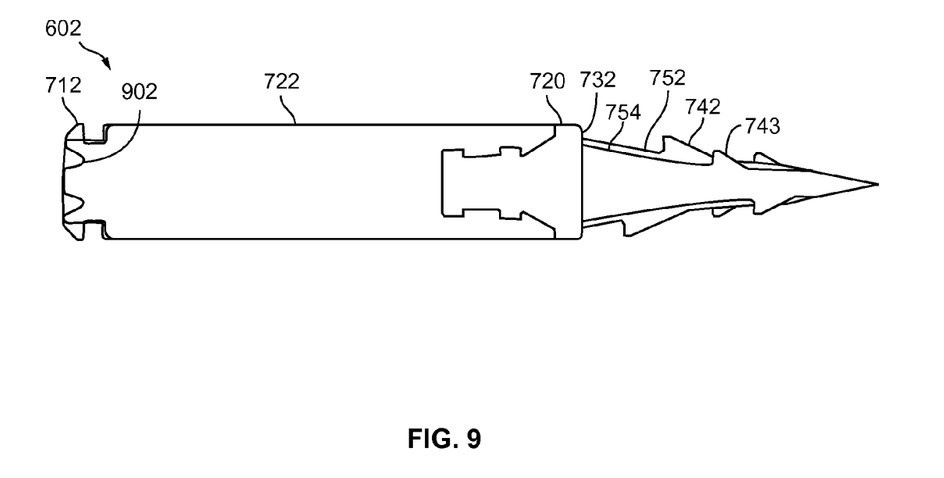
FIG. 9 is an overlay diagram of two orthogonal cross-sections of the electrode of FIG. 8 drawn to scale.

FIG. 9 presents an overlay diagram of a first cross-section of electrode 602 taken in the vertical plane as discussed above; and a second cross-section of electrode 602 taken in the horizontal plane as discussed above. The smaller dimensions of horizontal rib 754 (and 812) are obvious in comparison to the larger dimensions of vertical rib 752 (756).

Figure 10:
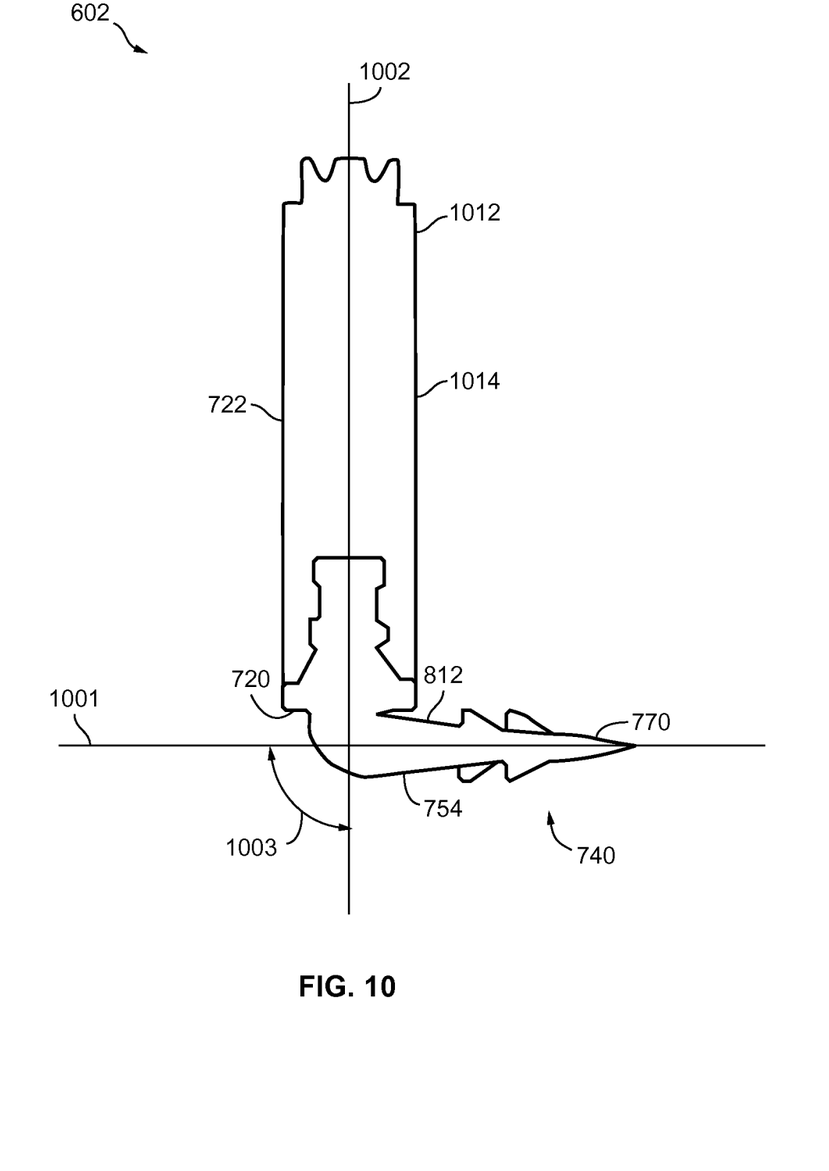
FIG. 10 is a cross-section of the electrode of FIG. 7 shown just after contact with a target, drawn to scale.

As a consequence of the material and geometry, electrode 602 dissipates kinetic energy after impact with a target. Dissipation is accomplished by bending as shown in FIG. 10. Electrode 602 of FIG. 10 has a central axis 1002 through mass 722 and a central axis 1001 through tip 770 and most of spear 720. On impact, axis 1001 intersects axis 1002 to define an angle 1003 that may be up to 90 degrees. The geometry and material as discussed above for spear 720 facilitate dissipation of kinetic energy in spear 720 (compressing rib 812 and extending rib 754 as shown). Kinetic energy may also be dissipated by impact of a portion of mass 722 and the target. The one or more regions of mass 722 that strike the target depend of course on the shape of the surface near the point of impact of tip 770 and clothing and/or tissue of the target. Aft region 1012 and/or mid region 1014 may strike the target.

EXAMPLES OF THE INVENTION

In a first example of the invention, an electrode comprises a surface and a spear. The surface is for launching the electrode from a weapon toward a human or animal target to deliver a current from the electrode through tissue of the target, the current for inhibiting voluntary movement by the target. The spear comprises material and geometry to deform in response to contact with the target to dissipate kinetic energy of the electrode.

In a second example, a deployment unit provides a current from a signal generator through tissue of a human or animal target, the current for inhibiting voluntary movement by the target. The deployment unit comprises a housing, an interface, a filament, and an electrode as described in the first example. The interface couples the housing to the signal generator. The interface receives the current. The filament conducts the current. The filament is stored in the housing prior to deployment. The filament is coupled to the interface for receiving the current. The electrode is stored in the housing prior to deployment.

In a third example, an electrode comprises a body, a tip, and spear. The body provides a surface for launching the electrode from an electronic weapon toward a human or animal target. The tip is formed to penetrate tissue of the target to place the spear in or near the tissue. The spear couples the body and the tip and comprises a rib that dissipates kinetic energy after contacting the target. The electrode provides a current from the electronic weapon through tissue of the target, the current for inhibiting voluntary movement by the target.

In a fourth example, a deployment unit provides a current from a signal generator through tissue of a human or animal target, the current for inhibiting voluntary movement by the target. The deployment unit comprises a housing, an interface, a filament, and an electrode as described in the third example. The interface couples the housing to the signal generator. The interface receives the current. The filament conducts the current. The filament is stored in the housing prior to deployment. The filament is coupled to the interface for receiving the current. The electrode is stored in the housing prior to deployment.

In a fifth example, an electrode includes a fastener and a deformable spear. The fastener couples a filament of an electronic weapon to the electrode. The filament provides a current from the electronic weapon through tissue of a human or animal target. The current inhibits voluntary movement by the target. The deformable spear dissipates kinetic energy in response to contact with the target.

In a sixth example, a deployment unit provides a current from a signal generator through tissue of a human or animal target. The current inhibits voluntary movement by the target. The deployment unit includes a housing, an interface, a filament, and an electrode as described in the fifth example. The interface couples the housing to the signal generator. The interface receives the current. The filament conducts the current. The filament is stored in the housing prior to deployment. The filament is coupled to the interface for receiving the current. The electrode is stored in the housing prior to deployment.

In a seventh example, an electrode includes an aft portion and a fore portion. The aft portion mechanically and electrically communicates with a filament of an electronic weapon. The filament provides a current from the electronic weapon through the electrode and through tissue of a human or animal target. The current inhibits voluntary movement by the target. The fore portion mechanically and electrically communicates with the target. The fore portion includes a rib for dissipating kinetic energy in the rib after the electrode makes contact with the target.

In an eighth example, a deployment unit provides a current from a signal generator through tissue of a human or animal target. The current inhibits voluntary movement by the target. The deployment unit includes a housing, an interface, a filament, and an electrode as described in the seventh example. The interface couples the housing to the signal generator. The interface receives the current. The filament conducts the current. The filament is stored in the housing prior to deployment. The filament is coupled to the interface for receiving the current. The electrode is stored in the housing prior to deployment.

Additional examples include any of the examples discussed above, wherein the spear diffuses current into target tissue.

Additional examples include any of the examples discussed above, wherein the spear is formed of an insulative material.

Additional examples include any of the examples discussed above, wherein the spear is formed of a resin that includes non-overlapping conductive particles and/or fibers.

Additional examples include any of the examples discussed above, wherein the electrode includes a body coupled to the spear and deformation facilitates contact of the body and the target to dissipate kinetic energy of the electrode.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

What is claimed is:
1. An electrode comprising:
a body comprising a surface and a longitudinal axis, a rapidly expanding gas applies a force on the surface to impart a kinetic energy to the electrode to launch the electrode in a forward direction from an electronic weapon along a trajectory toward a human or animal target; and
a spear comprising a first resilient rib, a second resilient rib, and a tip, the tip comprising a longitudinal axis, the spear mechanically coupled to a forward portion of the body;
wherein:
upon impact of the electrode with the target:
the tip penetrates tissue of the target to place the spear in or near target tissue;
the body moves away from the trajectory such that an angle between the longitudinal axis of the body and the longitudinal axis of the tip increases until a portion of the body strikes the target to dissipate a portion of the kinetic energy; and
responsive to movement of the body, the first rib compresses and the second rib extends to facilitate movement of the body toward the target and to dissipate a further portion of the kinetic energy; and
the electrode provides a current from the electronic weapon through tissue of the target, the current for inhibiting voluntary movement by the target.

2. A deployment unit for providing a current from a signal generator through tissue of a human or animal target, the current for inhibiting voluntary movement by the target, the deployment unit comprising:
- a housing;
- an interface that couples the housing to the signal generator, the interface for receiving the current;
- a filament that conducts the current, the filament stored in the housing prior to deployment, the filament coupled to the interface for receiving the current; and
- the electrode of claim 1 mechanically coupled to the filament and stored in the housing prior to deployment.

3. The electrode of claim 1 wherein the spear diffuses the current into the tissue.

4. The electrode of claim 1 wherein the spear further comprises a barb.

5. The electrode of claim 1 wherein as the one or more ribs deform a rear portion of the body rotates toward the target.

6. The electrode of claim 1 wherein the body and spear are formed of dissimilar composite materials.

* * * * *